United States Patent [19]
Cahill, III

[11] Patent Number: 5,812,217
[45] Date of Patent: Sep. 22, 1998

[54] AUTOMATICALLY ADJUSTING ANTI-GHOSTING FILTER COEFFICIENTS WHEN THE COEFFICIENTS EXCEED PARTICULAR VALUES

[75] Inventor: Benjamin M. Cahill, III, Ringoes, N.J.

[73] Assignee: Intel Corporation, Sant Clara, Calif.

[21] Appl. No.: 670,563

[22] Filed: Jun. 26, 1996

[51] Int. Cl.$^6$ ..................................................... H04N 5/213
[52] U.S. Cl. ........................... 348/614; 348/607; 348/914
[58] Field of Search ..................................... 348/192, 193, 348/466, 478, 607, 608, 611, 614, 914; 364/724.19, 724.2; 382/260, 261; 375/296, 232; H04N 5/21, 5/213

[56] References Cited

U.S. PATENT DOCUMENTS

| | | |
|---|---|---|
| 4,502,077 | 2/1985 | Morotomi et al. . |
| 4,600,943 | 7/1986 | Tanabe . |
| 4,658,294 | 4/1987 | Park . |
| 4,667,235 | 5/1987 | Nozoe et al. . |
| 4,774,715 | 9/1988 | Messenger . |
| 5,089,892 | 2/1992 | Koguchi et al. . |
| 5,293,234 | 3/1994 | Ko ........................................... 348/614 |
| 5,311,311 | 5/1994 | Harigai et al. . |
| 5,311,312 | 5/1994 | Oh . |
| 5,371,545 | 12/1994 | Tults . |
| 5,483,289 | 1/1996 | Urade et al. . |
| 5,486,865 | 1/1996 | James . |
| 5,491,518 | 2/1996 | Kim . |
| 5,506,626 | 4/1996 | Yagi et al. . |
| 5,512,954 | 4/1996 | Shintani . |

(List continued on next page.)

FOREIGN PATENT DOCUMENTS

| | | |
|---|---|---|
| 0 516 216 A2 | 12/1992 | European Pat. Off. . |
| 0 552 577 A1 | 7/1993 | European Pat. Off. . |
| 0 617 551 A1 | 9/1994 | European Pat. Off. . |
| 4-227378 A | 8/1992 | Japan . |
| 08317254 A | 11/1996 | Japan . |
| WO 94/27400 | 11/1994 | WIPO . |

OTHER PUBLICATIONS

*PCT International Search Report* for International Application No. PCT/US97/10360 (Docket No. 42390P3734), dated Oct. 09, 1997, 1 page.

*PCT International Search Report* for International Application No. PCT/US97/10362 (Docket No. 42390.P3733), dated Oct. 17, 1997, 1 page.

*PCT International Search Report* for International Application No. PCT/US97/10350 (Docket No. 42390.P3735), dated Jan. 27, 1998, 1 page.

Joint EIA/CVCC Recommended Practice for Teletext: North American Basic Teletext Specification(NABTS), EIA Standard: EIA—516, May 1988, Pages: Cover, Preface, i–vi, 1–5, and 62–65.

"Recommended Practice for Line 21 Data Service", EIA Standard: EIA—608, Sep. 1994, Pages: Cover, i–iv, and 7–9.

*PCT International Search Report* for International Application No. PCT/US97/09759, dated Sep. 04, 1997, 1 page.

*Primary Examiner*—Sherrie Hsia
*Attorney, Agent, or Firm*—Blakely, Sokoloff, Taylor & Zafman

[57] ABSTRACT

A method and apparatus for the self-correcting of anti-ghosting filter coefficients is provided. A plurality of coefficients associated with an anti-ghosting filter are monitored as data is received by the filter. The plurality of coefficients are adjusted if one or more of the plurality of coefficients exceed a first value. In one embodiment, the filter is an adaptive baseband equalization filter. If the magnitude of one or more secondary coefficients of the adaptive baseband equalization filter exceed a predetermined factor of the primary coefficient, then the plurality of coefficients are adjusted. In another embodiment, the filter is a lookup table filter. If the magnitude of a coefficient in the lookup table is greater than a predetermined value, the plurality of coefficients are adjusted.

32 Claims, 6 Drawing Sheets

U.S. PATENT DOCUMENTS

| | | |
|---|---|---|
| 5,517,249 | 5/1996 | Rodriguez-Cavazos et al. . |
| 5,521,645 | 5/1996 | Ezaki . |
| 5,537,151 | 7/1996 | Orr et al. . |
| 5,552,726 | 9/1996 | Wichman et al. . |
| 5,555,024 | 9/1996 | Limberg . |
| 5,555,025 | 9/1996 | McArthur . |
| 5,559,560 | 9/1996 | Lee . |
| 5,561,469 | 10/1996 | Schultz . |
| 5,565,930 | 10/1996 | Bolger et al. . |
| 5,589,886 | 12/1996 | Ezaki . |
| 5,590,154 | 12/1996 | Forni ........................................ 375/229 |
| 5,654,765 | 8/1997 | Kim . |
| 5,657,088 | 8/1997 | Hankinson . |

AUTOMATICALLY ADJUSTING ANTI-GHOSTING FILTER COEFFICIENTS WHEN THE COEFFICIENTS EXCEED PARTICULAR VALUES

BACKGROUND OF THE INVENTION

1. Field of the Invention

The present invention pertains to the field of television signal processing. More particularly, this invention relates to determining when to correct anti-ghosting parameter training for a teletext scan line.

2. Background

Television transmission signals typically account for a vertical blanking interval (VBI). The VBI refers to the time required by the electron gun in a conventional television set (or similar visual display) to reset itself to the top of the television screen from the bottom of the screen. Conventional television sets and many other visual displays generate their display by using an electron gun(s) to illuminate each line on the television screen. The electron gun illuminates a single line at a time and typically starts at the top of the screen, illuminates every other line as it travels down the screen, then resets itself to the top of the screen once it reaches the bottom. During this reset from the bottom of the screen to the top of the screen, no lines of the screen are being illuminated. This period of reset is referred to as the VBI.

During the VBI, no video information is transmitted by a broadcasting device because the electron gun is not illuminating lines at that time. Thus, control information and/or other data can be transmitted during the VBI rather than video and/or audio information without disrupting the video and/or audio transmission. Typically, a portion of the VBI is used by television broadcasters for control information necessary for displaying the audio and video information. This control information includes, for example, vertical and horizontal video synchronization signals. In addition, a portion of the VBI is typically reserved for broadcasting the text for closed captioning for the hearing impaired. However, unused space remains in the VBI which can be used by a broadcaster to broadcast any of a wide variety of data, typically referred to as teletext data, of the broadcaster's choosing.

One problem inherent in the transmission of television signals is referred to as "ghosting". Ghosting results from an echo(es) of the transmitted signal. Ghosting occurs when there is a reflection of a television signal or similar "bouncing" of the signal off of a particular object in or near the signal's path. Ghosting presents a problem when transferring data over the VBI because the reflected or echoed signal(s) interferes with the data being transmitted.

Several anti-ghosting mechanisms have been developed to reduce the effects of ghosting in a television transmission signal. Two such mechanisms are referred to as Adaptive Baseband Equalization (ABBE) filtering and Lookup Table (LUT) filtering. Both of these anti-ghosting filtering mechanisms look at one or more surrounding samples for a particular sample of data and perform various filtering processes using these samples to reduce the ghosting effects on the signal being transferred.

One method of using ABBE and LUT filters accounts for "training" the filters. Training refers to adjusting the filtering parameters or coefficients over time to better filter the data being received. However, one problem which can arise with training is that it is possible for the filtering coefficients to be trained in the wrong direction. When the filtering coefficients are trained in the wrong direction, the training results in a filtered signal that is worse than the originally received signal. In these situations, the filters end up harming the data more than helping it. Therefore, it would be beneficial to provide a mechanism to automatically detect when the anti-ghosting filter parameters need to be corrected.

Additionally, it is typically difficult for the average individual to know when the anti-ghosting filter parameters need to be corrected. Furthermore, even if the individual does know when the parameters need to be corrected, it is an inconvenience for the individual to have to perform this correction manually. Therefore, it would be beneficial to provide a mechanism to automatically detect when the anti-ghosting filter parameters need to be corrected.

As will be described in more detail below, the present invention provides a self-correcting anti-ghosting process to achieve these and other desired results which will be apparent to those skilled in the art from the description that follows.

SUMMARY OF THE INVENTION

A self-correcting anti-ghosting process is described herein. The mechanism monitors a plurality of coefficients associated with a filter which provides anti-ghosting to received data. The mechanism adjusts the plurality of coefficients if one or more of the plurality of coefficients exceed a first value.

In an embodiment, the mechanism compares the magnitudes of the secondary coefficients of an adaptive baseband equalization filter to the primary coefficient of the filter. The mechanism then adjusts the plurality of coefficients if the magnitude of one or more of the secondary coefficients is greater than a predetermined factor of the primary coefficient.

In another embodiment, the mechanism checks whether the magnitude of a coefficient of a lookup table filter is greater than a predetermined value. The mechanism then adjusts the plurality of coefficients if the magnitude of the coefficient is greater than the predetermined value.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
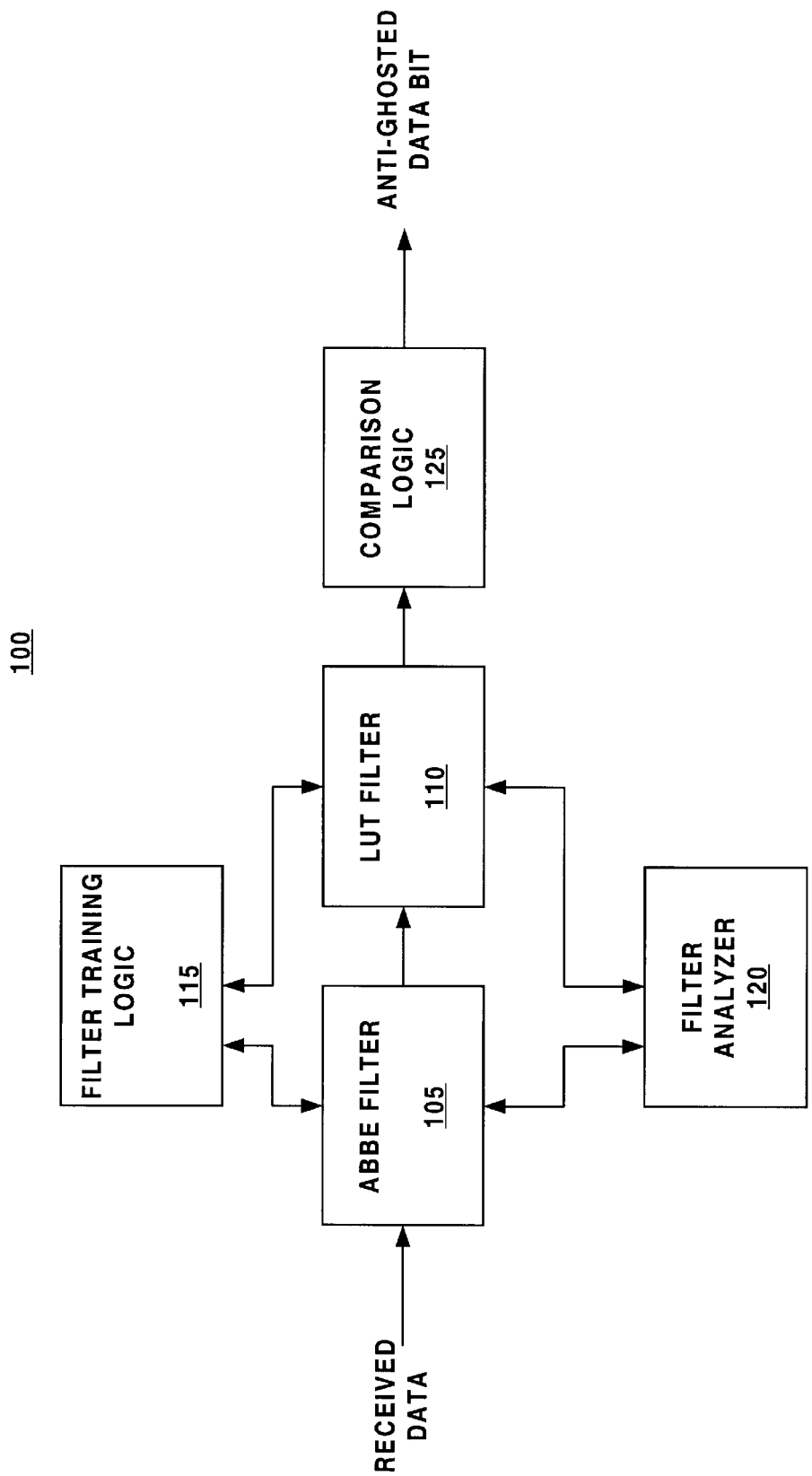
FIG. 1 is a block diagram illustrating an overview of one embodiment of the present invention.

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

According to one embodiment, the present invention improves anti-ghosting filtering in a VBI decoder system. The present invention continuously monitors the coefficients used for anti-ghosting filtering. The anti-ghosting filtering and training of filtering coefficients continues until the present invention notes that one or more parameters have grown beyond a predetermined value(s). When this happens, the present invention adjusts the parameters to a particular value(s), and then allows the filtering and training to continue.

In one embodiment, the present invention is practiced in conjunction with an adaptive filtering selection mechanism as disclosed in copending U.S. patent application Ser. No. 08/672,257 entitled, A Mechanism for Adaptive Selection of Anti-Ghosting Filtering, invented by the inventor of the present invention, and filed contemporaneously with the present application.

FIG. 1 is a block diagram illustrating an overview of one embodiment of the present invention. FIG. 1 shows an anti-ghosting filtering process 100 according to one embodiment of the present invention. Data is received during a vertical blanking interval of a North American Broadcast Television Specification (NABTS) signal[1]. The data is filtered through both an Adaptive Baseband Equalization (ABBE) filter 105 and a Lookup Table (LUT) filter 110 for anti-ghosting filtering. The output of the LUT filter 110 is the anti-ghosted data. The anti-ghosted data is then input to the comparison logic 125, where the anti-ghosted data is compared to a predetermined threshold to determine whether the anti-ghosted data represents a logical zero or a logical one.

[1] See Joint EIA/CVCC Recommended Practice for Teletext North American Basic Teletext Specification (NABTS), EIA-516, May 1988.

The anti-ghosting process 100 also includes filter training logic 115 and filter analyzer 120. The filter training logic 115 modifies the coefficients used by the ABBE filter 105 and the LUT filter 110 based on the anti-ghosted data. The filter analyzer 120 periodically checks the coefficients being used by both the ABBE filter 105 and the LUT filter 110. If the coefficients have grown beyond a particular predetermined value(s), then the filter analyzer 120 corrects the coefficients, as discussed in more detail below.

In one embodiment of the present invention, the received data is teletext data sampled at periodic intervals. Each sampled portion of the input data stream is represented by an 8-bit value which will be later interpreted as a logical zero or a logical one. This 8-bit value is received by the ABBE filter 105 and the LUT filter 110, which apply various filtering techniques to the value in order for the decoder to correctly identify whether the digital value of the 8-bit representation of the sampled analog value is a logical zero or a logical one.

The ABBE filter 105 is an n-tap filter which applies various filtering in accordance with configured filtering coefficients, also referred to as parameters, to the current sampled value being analyzed and the surrounding sampled values. The ABBE filter 105 includes, for each tap, a corresponding coefficient. The number of surrounding sampled values which are used by the filter depends on the value of "n". Each tap in the filter refers to one of the sampled values being used by the filter. For example, in a 5-tap filter, the current sampled value being analyzed as well as the immediately subsequent two sampled values and the immediately preceding two sampled values are used by the filter.

Figure 2A:
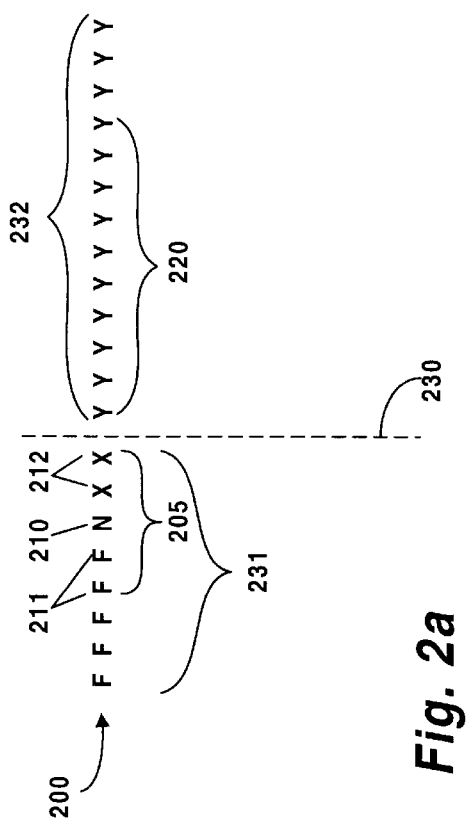
FIG. 2a illustrates an example of a data stream such as may be used with one embodiment of the present invention.

FIG. 2a illustrates an example of a 5-tap filter. In FIG. 2a, an input data stream 200 is shown including previously analyzed values (denoted by an "X" or a "Y" in the stream 200), future values to be analyzed (denoted by an "F" in the stream 200), and the current value being analyzed (denoted by an "N" in the stream 200). A 5-tap filter span 205 is shown, which includes the current value being analyzed 210, the immediately subsequent two values 211, and the immediately preceding two values 212.

A dividing line 230 is also shown in FIG. 2a. The dividing line 230 illustrates the separation between the 8-bit representations of sampled values and single-bit logical values (that is, a logical zero or a logical one). The set of values 231 of the input stream 200, illustrated as "X", "F", and "N", are multiple-bit representations of sampled values, and the set of values 232 of the input stream 200, illustrated as "Y", have already been decoded as single-bit logical values.

A different coefficient is applied to each of the sampled values used by the ABBE filter. In one embodiment, the initial coefficients for a 5-tap filter are: (0 0 16 0 0). However, these coefficients can change over time, as discussed below. The coefficient corresponding to the sampled value currently being analyzed is referred to as the primary coefficient, and the remaining coefficients are referred to as secondary coefficients. Thus, in the example illustrated in FIG. 2a, the current value 210 is multiplied by the coefficient 16 (the primary coefficient), and the preceding values 212 and subsequent values 211 are each multiplied by the coefficient 0 (the secondary coefficients). The five values 210–212, after being multiplied by their coefficients, are summed together and then normalized, thereby providing an ABBE-filtered value representing the sampled data value.

The ABBE coefficients are slowly trained over time. This training is done by periodically comparing the results of the ABBE-filtered value to the ideal expected value and adding a fraction of the difference between the ABBE-filtered value and the ideal value to the coefficient. The ABBE-filtered value is compared to the closest ideal value, the difference is calculated, and the difference is applied to each of the coefficients in a conventional manner. It is to be appreciated that the speed with which the ABBE coefficients are trained can be altered. For example, the coefficients may be updated after every ABBE-filtered value, or alternatively, the coefficients may be updated periodically, such as after every fifteen values are filtered. The training of ABBE coefficients is well-known to those skilled in the art, and thus will not be discussed further, except as it pertains to the present invention.

It is to be appreciated that although a 5-tap filter is discussed above, any of a wide range of taps may be used for the ABBE filter. Typically, an odd number of taps is used to provide symmetry about the value being analyzed. However, an even number of taps may also be used. By way of example, an 11-tap filter or 10-tap filter may be used by the present invention. Additionally, a decoder may support a predetermined set of n-tap filters, such as 0-tap, 5-tap and 11-tap filters.

The second anti-ghosting filtering mechanism used by the present invention is the Lookup Table (LUT) filter 110. The LUT filter 110 accounts for data values of previously analyzed bits which are outside the range of the ABBE filter. The LUT filter 110 uses a predetermined number of the preceding data samples as an index into a predetermined table. In one embodiment of the present invention, ten preceding data samples are used as the index, however, it is to be appreciated that different numbers of samples can be used.

FIG. 2a illustrates an example of an LUT index according to one embodiment of the present invention. A 10-bit index 220 from the stream 200 is shown. As illustrated, the LUT index 220 is taken from the range of bits outside the ABBE filter span 205. It is to be appreciated that all of the preceding values (denoted by an "X" or a "Y") have already been analyzed by the anti-ghosting filters, regardless of whether they are used in the filtering of subsequent values as multiple-bit representations of the sampled values or as single-bit logical values.

Figure 2B:
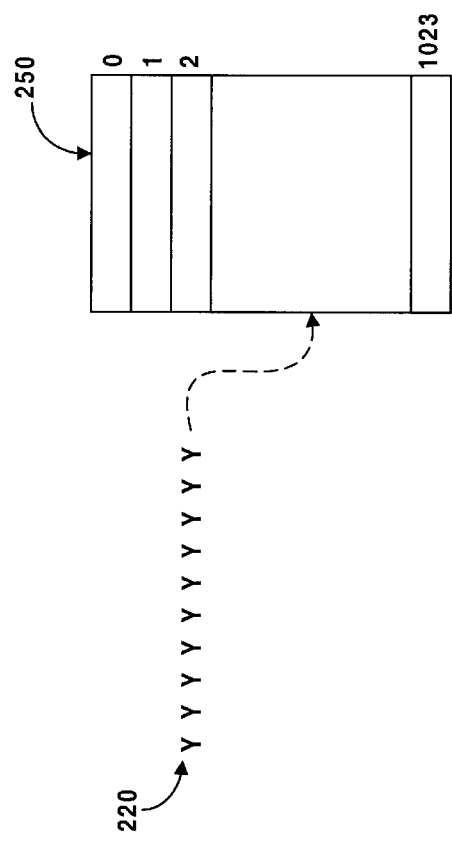
FIG. 2b illustrates a lookup table and index according to one embodiment of the present invention.

The ten bits 220 of the LUT index are concatenated together and used as an index into the lookup table 250 as illustrated in FIG. 2b. Given that the index is a ten-bit value, it is to be appreciated that the lookup table 250 is a 1024-entry table, with each index value indexing into a unique location of the table.

The value derived from the lookup table is then added to the ABBE-filtered value, resulting in an anti-ghosted value. In one implementation, this anti-ghosted value is a 32-bit positive or negative value. The comparison logic 125 compares this anti-ghosted value to a predetermined threshold to determine whether the value represents a logical zero or a logical one. In one implementation, this predetermined threshold is zero. If the anti-ghosted value is greater than or equal to zero, then the value is identified as a logical zero. Correspondingly, if the anti-ghosted value is less than zero, then the value is identified as a logical one.

The LUT coefficients (that is, the values stored in the entries of the lookup table) are also trained and can therefore change over time. Initially, each entry in the lookup table 250 has a value of zero. For training, the difference between the ABBE-filtered value and the closest ideal value, discussed above, is compared to the value derived from the lookup table 250. A predetermined fraction (for example, $\frac{1}{64}$) of the difference is then added to the indexed entry of the lookup table 250.

Therefore, it can be seen that both the LUT and the ABBE coefficients can change over time. The goal of this changing is to allow the ABBE-filtered and LUT-filtered values to adapt over time to be closer to the ideal values. However, because of this change, situations can arise where the coefficients are changed so that the ABBE-filtered and LUT-filtered values are further from the ideal values than the unfiltered values were.

The present invention resolves this situation by adjusting the LUT and ABBE coefficients under certain circumstances. As discussed below, the present invention, according to one embodiment, monitors both the LUT and ABBE coefficients to determine when to correct both sets of coefficients.

Figure 3:
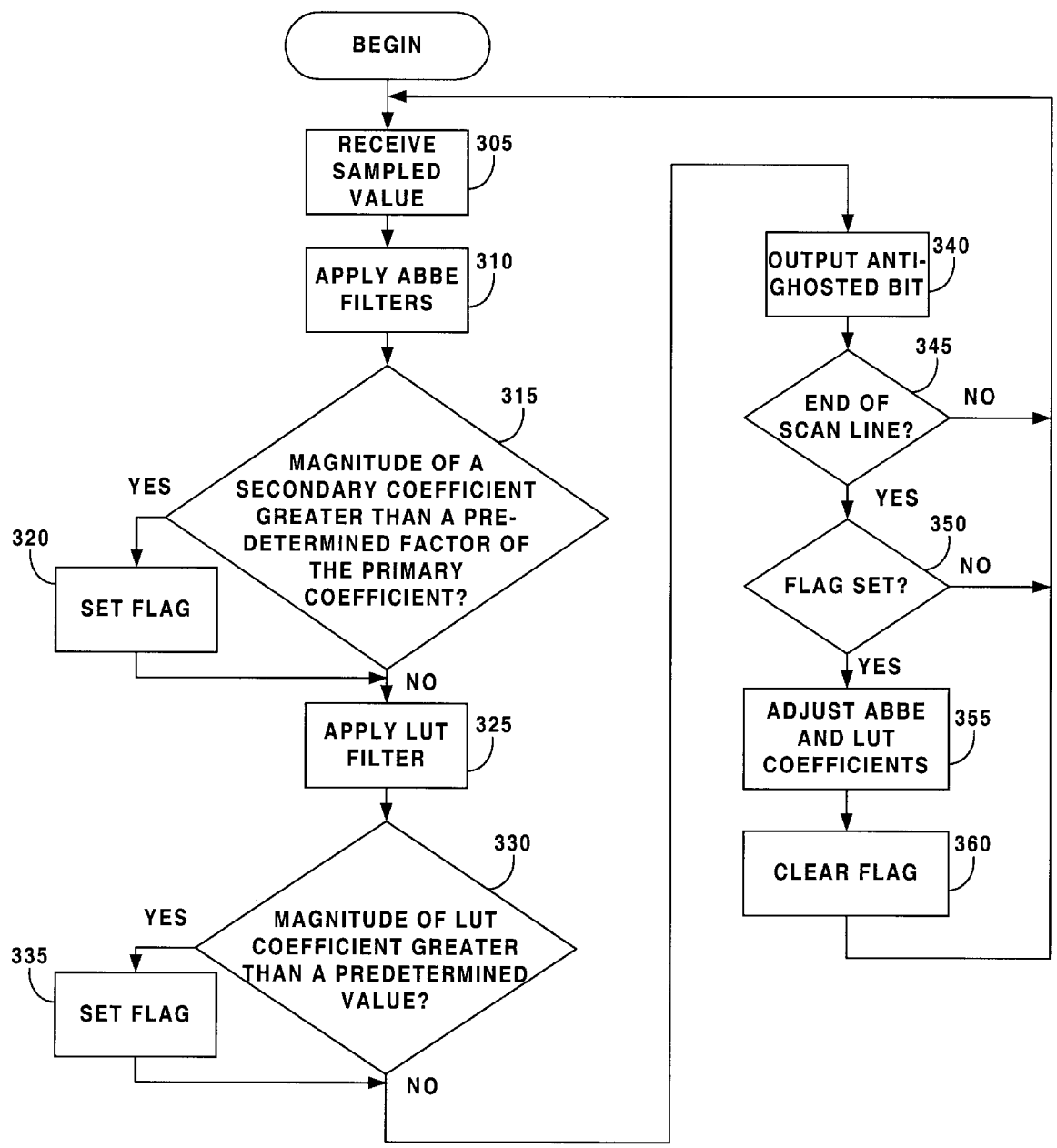
FIG. 3 illustrates the process of determining when to adjust anti-ghosting parameters according to one embodiment of the present invention.

FIG. 3 illustrates the process of determining when to adjust anti-ghosting parameters according to one embodiment of the present invention. As illustrated in FIG. 3, a sampled value is first received by the anti-ghosting process, step 305. The anti-ghosting process then applies ABBE filtering to the sampled value, step 310. Training of the ABBE filters, if any, due to this sampled value also occurs in step 310. The filter analyzer then checks whether the magnitude of any secondary coefficient is greater than a predetermined factor of the primary coefficient, step 315. In one implementation, this predetermined factor is 0.75, however, it is to be appreciated that any of a wide range of factors can be used. A typical range of factors is 0.5–1.0. This predetermined factor can be determined empirically so that the ABBE filtering coefficients are not trained too far in the wrong direction, thereby causing the ABBE filtered values to be further from the ideal values than the unfiltered values were, while still providing a significant amount of anti-ghosting filtering.

If the magnitude of any secondary coefficient is greater than the predetermined factor of the primary coefficient in step 315, then the filter analyzer sets a flag, step 320. Otherwise, the flag is not set. This flag is used to indicate that the anti-ghosting filtering coefficients are to be corrected, as discussed below.

Regardless of whether the flag is set in step 320, the anti-ghosting process then applies the LUT filter to the ABBE filtered value, step 325. Training of the LUT coefficients, if any, due to this sampled value also occurs in step 325. The filter analyzer then checks whether the magnitude of the LUT coefficient corresponding to the value currently being analyzed is greater than a predetermined value, step 330. In one implementation, this predetermined value is $40_{16}$. This predetermined value can be determined empirically so that the LUT filtering coefficients are not trained too far in the wrong direction, thereby causing the LUT filtered values to be further from the ideal values than the unfiltered values were, while still providing a significant amount of anti-ghosting filtering.

If the magnitude of the LUT coefficient is greater than the predetermined value in step 330, then the filter analyzer sets a flag, step 335. Otherwise, this flag is not set. In one implementation, this is the same flag as discussed above in step 320.

Regardless of whether the flag is set in step 335, the anti-ghosting process, after applying the ABBE and LUT filters, outputs an anti-ghosted bit, step 340. This anti-ghosted bit is either a logical zero or a logical one. The anti-ghosting process then checks whether the end of the scan line has been reached yet, step 345. If all data in the scan line has not yet been analyzed, then the anti-ghosting process returns to step 305 to filter another bit of data. However, if the end of the scan line has been reached then the anti-ghosting process checks whether a flag has been set, step 350. If no flags have been set, then the anti-ghosting process returns to step 305 to begin processing data from the next scan line.

However, if a flag has been set in either step 320 or step 335, then the anti-ghosting process adjusts the ABBE and LUT coefficients, step 355. The flag being set indicates that the ABBE and/or LUT coefficients are believed to have become more damaging than helpful, and that the coefficients are to be corrected. In one implementation, these coefficients are reset by returning them to their initial values, such as (0 0 16 0 0) for the 5-tap ABBE filter and all zeros for the lookup table. In an alternate embodiment, the ABBE and LUT coefficients may be adjusted by returning them to another predetermined value or to a previously stored set of coefficients. The anti-ghosting process then clears the flag(s), step 360, and returns to step 305 to begin anti-ghosting data in the next scan line.

In the embodiment discussed above, a single flag value is used for the entire scan line, and the anti-ghosting coefficients are reset, if necessary, after anti-ghosting of the scan line has completed. It is to be appreciated, however, that in alternate embodiments the anti-ghosting coefficients can be reset at different intervals. By way of example, the anti-ghosting process could check two or three times per scan line for a flag to be set, or alternatively could reset the anti-ghosting coefficients as soon as a flag is set.

It should be noted that, in certain embodiments of the present invention, at the beginning and the end of the scan line there may not be sufficient data to provide the necessary data points for the ABBE filter span and the LUT index. In one embodiment, this situation is resolved by the anti-ghosting process beginning to process the input data prior to the beginning of the actual data, such as by processing part of the run-in clock signal. At the end of the scan line, a predetermined pattern of data can be presumed to exist. With regard to the LUT index, the present invention can presume a predefined pattern to exist behind data which it does not have.

It is to be appreciated that although the anti-ghosting process is described above as including both the ABBE and LUT filters, alternate embodiments may include only one or the other. Additionally, alternate embodiments of the present invention may use different flags for determining whether to correct coefficients due to ABBE or LUT problems. If the flag for ABBE is set, then only the ABBE coefficients are corrected, and if the flag for the LUT is set then only the LUT coefficients are corrected. Both ABBE and LUT coefficients are reset in this alternate embodiment only when both flags are set.

It is also to be appreciated that although the present invention is discussed as correcting the anti-ghosting coefficients whenever a particular coefficient exceeds a particular predetermined value, alternate embodiments may wait for two, three, or more situations to arise where a particular coefficient exceeds a particular predetermined value(s).

Figure 4:
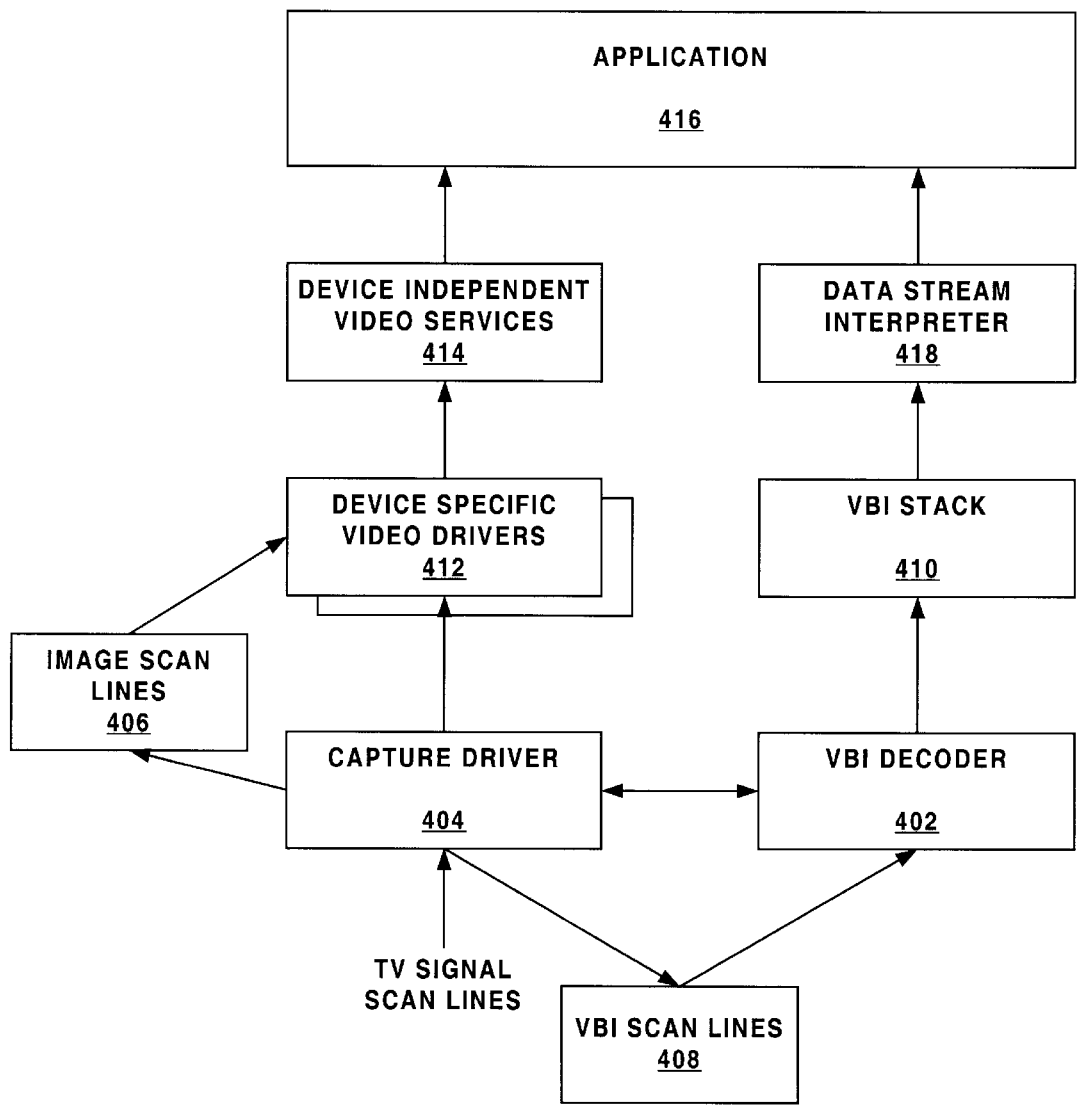
FIG. 4 illustrates one embodiment of a software environment suitable for practicing the present invention.

FIG. 4 illustrates one embodiment of a software environment suitable for practicing the present invention. As illustrated, software embodiment 400 includes common VBI scan line decoder 402 (hereinafter simply common decoder) and capture driver 404, cooperating with each other to generate image scan lines 406 and VBI scan lines 408. VBI scan lines 408 are decoded by decoder 402 into VBI stack 410. Decoded scan lines 408 are in turn interpreted by data stream interpreter 418. Common decoder 402 includes the anti-ghosting filtering discussed above. Common decoder 402 and capture driver 404 are disclosed in copending U.S. patent application Ser. No. 08/670,568 entitled, Method And Apparatus For Common Vertical Blanking Interval Scan Line Decoding, invented by the inventor of the present invention, and filed contemporaneously with the present application.

Additionally, image scan lines 406 are processed by device dependent video drivers 412, for example VfW drivers that implement Microsoft DirectX™ video support, which in turn provides the processed data to a device independent video service 414, such as Microsoft Video for Windows. The device independent video service 414 then generates the television images for application 416. With respect to the decoded VBI data (including closed captions), data stream interpreter 418 interprets the decoded VBI data for display to the user via application 416 or other purposes within application 416.

Figure 5:
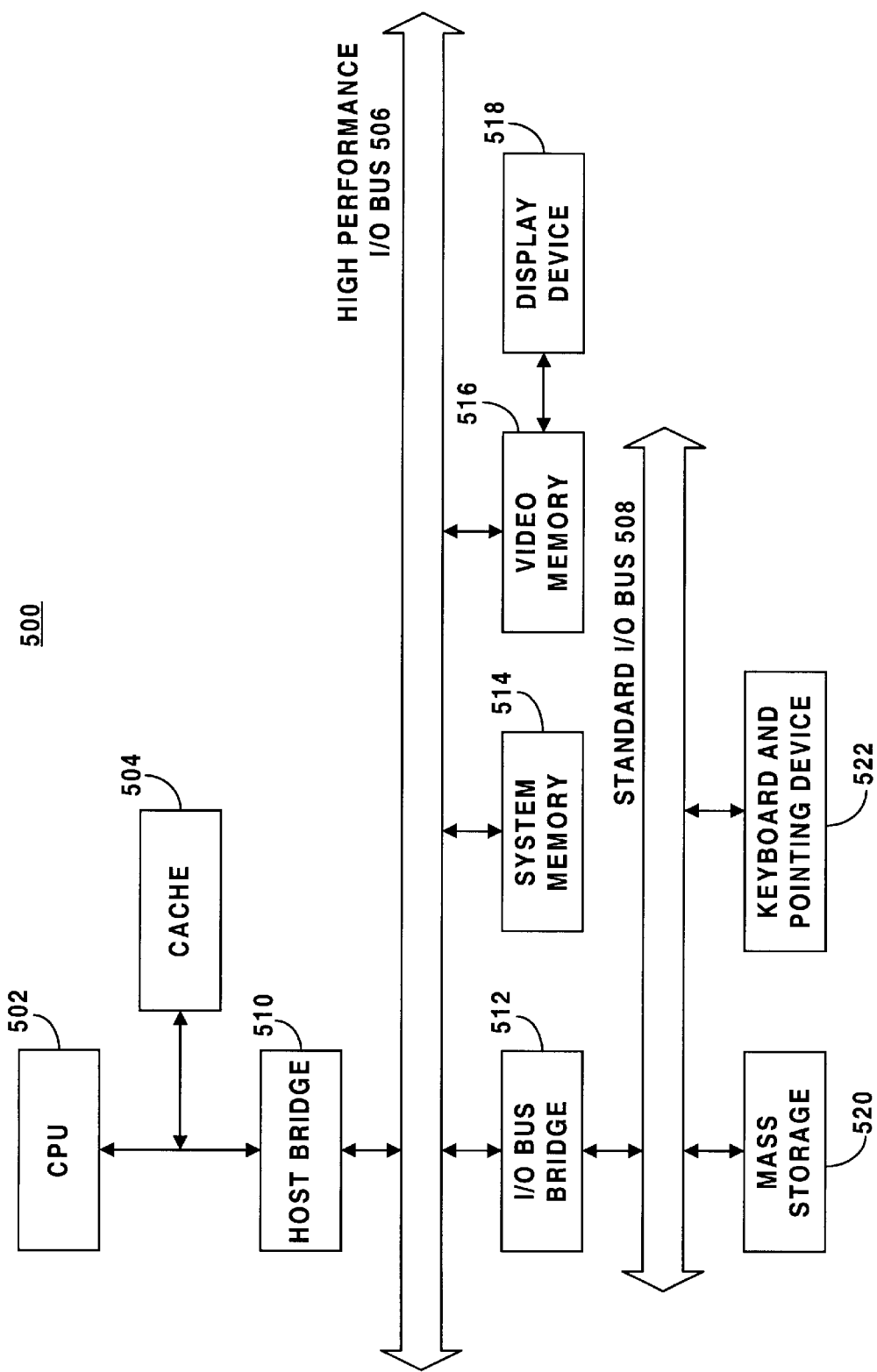
FIG. 5 illustrates one embodiment of a hardware system suitable for programming with the software elements of FIG. 4.

FIG. 5 illustrates one embodiment of a hardware system suitable for programming with the software elements of FIG. 4. As shown, for the illustrated embodiment, hardware system 500 includes CPU 502 and cache memory 504 coupled to each other as illustrated. Additionally, hardware system 500 includes high performance I/O bus 506 and standard I/O bus 508. Host bridge 510 couples CPU 502 to high performance I/O bus 506, whereas I/O bus bridge 512 couples the two buses 506 and 508 to each other. Coupled to bus 506 are system memory 514 and video memory 516. In turn, display device 518 is coupled to video memory 516. Coupled to bus 508 is mass storage 520 and keyboard and pointing device 522.

These elements 502–522 perform their conventional functions known in the art. In particular, mass storage 520 is used to provide permanent storage for the programming instructions implementing the above described functions, whereas system memory 514 is used to provide temporary storage for the programming instructions when executed by CPU 502. Mass storage 520 may be provided with the programming instructions by loading the programming instructions from a distribution storage medium (not shown), or by downloading the programming instructions from a server (not shown) coupled to hardware system 500 via a network/communication interface (not shown). Collectively, these elements are intended to represent a broad category of hardware systems, including, but not limited to, general purpose computer systems based on the Pentium® processor, manufactured by Intel Corp. of Santa Clara, Calif., assignee of the present invention.

Figure 6:
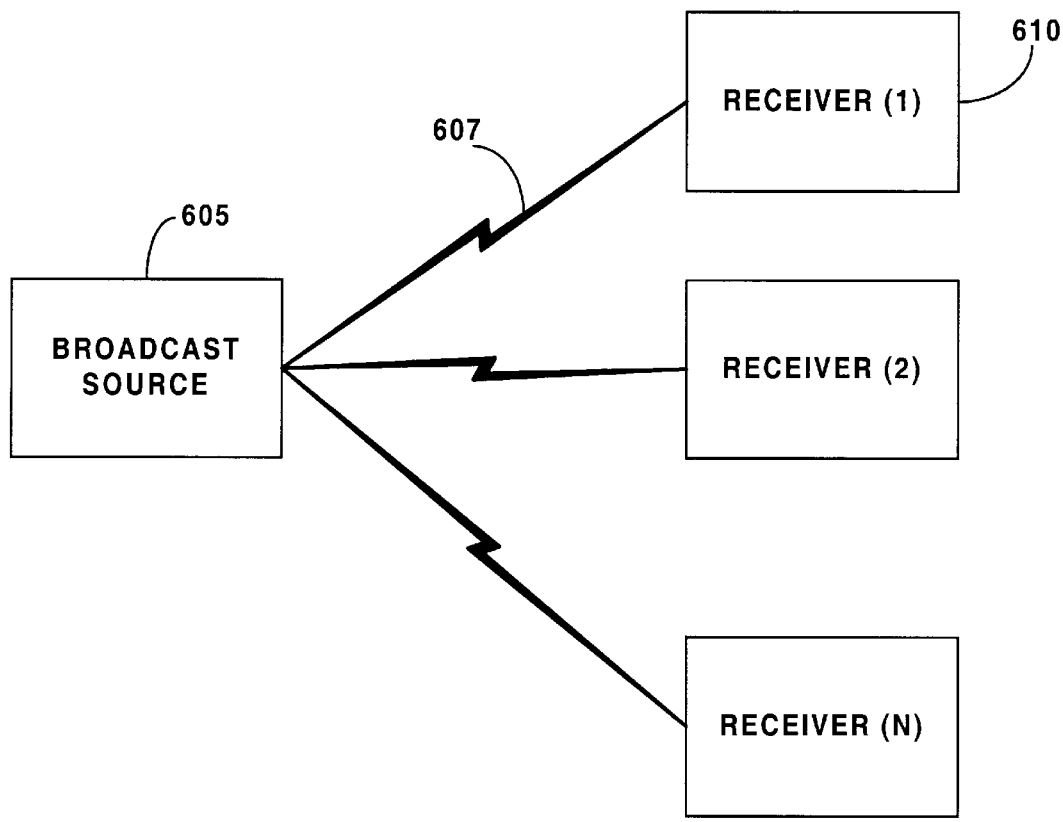
FIG. 6 shows an overview of a signal transmitting and receiving system such as may be used with one embodiment of the present invention.

FIG. 6 shows an overview of a signal transmitting and receiving system 600 such as may be used with one embodiment of the present invention. Transmission signals originate at transmission source 605. Transmission source 605 may be any of a wide variety of conventional signal broadcasting devices, such as a satellite dish, a television transmitter, etc. Transmission source 605 transmits a signal over a transmission medium 607 to multiple (N) receivers 610. Transmission medium 607 represents any of a wide variety of conventional signal transmission media. For example, transmission medium 607 may be a cable, a fiber-optic cable, or a wireless medium transmitting electromagnetic signals in the electromagnetic spectrum. Transmission medium 607 may also include any number of conventional routing or repeating devices, such as satellites or electromagnetic signal repeaters.

Receiver 610 receives the signal transmitted by broadcast source 605. Receiver 610 may be any of a wide variety of conventional signal receiving devices. Receiver 610 may be included as part of a video cassette recorder (VCR), a television set, a computer system, etc. In one implementation, one or more receivers 610 is a hardware system 500 as shown in FIG. 5. The receipt of signals via a transmission medium is well-known to those skilled in the art and thus will not be discussed further.

In the discussions above, the NABTS signal under the National Television Standards Committee (NTSC) is discussed. However, it is to be appreciated that the present invention can be used with any television signal which includes a vertical blanking information. For example, the present invention could be used with the Phase Alternate Line (PAL) broadcast standard utilized in many European countries, or the sequential color with memory (SECAM) broadcast standard used in other European Countries.

It is also to be appreciated that although television transmission signals are discussed above, the present invention is equally applicable to other types of transmitted signals.

It is also to be appreciated that although ABBE and LUT filtering are discussed above, other types of anti-ghosting filtering can also be used within the spirit and scope of the present invention.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a mechanism for determining when to reset anti-ghosting parameter training has been described.

What is claimed is:

1. A method for determining when to adjust a plurality of coefficients associated with a filter, the filter providing anti-ghosting to received data, the method comprising:

monitoring the plurality of coefficients as the data is filtered by the filter; and adjusting the plurality of coefficients if one or more of the plurality of coefficients exceed a first value.

2. The method of claim 1, wherein the adjusting comprises:

setting a flag value, the flag value indicating whether the one or more of the plurality of coefficients exceeds the first value; and accessing the flag value at the end of a scan line of a vertical blanking interval and resetting the plurality of coefficients if the flag value is set.

3. The method of claim 1, wherein the filter is an adaptive baseband equalization filter and the monitoring comprises checking whether a secondary coefficient corresponding to the adaptive baseband equalization filter is of a greater magnitude than a primary coefficient corresponding to the adaptive baseband equalization filter.

4. The method of claim 3, wherein the adjusting comprises resetting the plurality of coefficients if the secondary coefficient is of a greater magnitude than the primary coefficient.

5. The method of claim 3, wherein the adjusting comprises resetting the plurality of coefficients if the secondary coefficient is of a greater magnitude than a predetermined factor of the primary coefficient.

6. The method of claim 1, wherein the filter is a lookup table filter and the monitoring comprises checking whether a coefficient of the plurality of coefficients corresponding to the data is greater than the first value.

7. The method of claim 6, wherein the adjusting comprises resetting the plurality of coefficients if the coefficient is greater than the first value.

8. The method of claim 1, further comprising receiving the data during a vertical blanking interval.

9. A computer-readable medium having stored thereon a plurality of instructions, the plurality of instructions including instructions which, when executed by a processor, result in:

monitoring a plurality of coefficients associated with a filter, the filter providing anti-ghosting to received data; and adjusting the plurality of coefficients if one or more of the plurality of coefficients exceed a first value.

10. The computer-readable medium of claim 9, the plurality of instructions including instructions which, when executed by the processor, further result in:

setting a flag value, the flag value indicating whether the one or more of the plurality of coefficients exceeds the first value; and accessing the flag value at the end of a scan line of a vertical blanking interval and resetting the plurality of coefficients if the flag value is set.

11. The computer-readable medium of claim 9, wherein the monitoring comprises checking whether a secondary coefficient corresponding to the anti-ghosting filter is of a greater magnitude than a primary coefficient corresponding to the anti-ghosting filter.

12. The computer-readable medium of claim 11, wherein the adjusting comprises resetting the plurality of coefficients if the secondary coefficient is of a greater magnitude than the primary coefficient.

13. The computer-readable medium of claim 11, wherein the adjusting comprises resetting the plurality of coefficients if the secondary coefficient is of a greater magnitude than a predetermined factor of the primary coefficient.

14. The computer-readable medium of claim 9, wherein the monitoring comprises checking whether a coefficient of the plurality of coefficients corresponding to the data is greater than the first value.

15. The computer-readable medium of claim 14, wherein the adjusting comprises resetting the plurality of coefficients if the coefficient is greater than the first value.

16. The computer-readable medium of claim 9, the plurality of instructions including instructions which, when executed by the processor, further result in receiving the data during a vertical blanking interval.

17. An apparatus comprising:

a first logic to monitor a plurality of coefficients associated with a filter, the filter providing anti-ghosting to received data; and a second logic to adjust the plurality of coefficients if one or more of the plurality of coefficients exceed a first value.

18. The apparatus of claim 17, wherein the second logic comprises:

a first circuitry to set a flag value, the flag value indicating whether the one or more of the plurality of coefficients exceeds the first value; and a second circuitry to access the flag value at the end of a scan line of a vertical blanking interval and reset the plurality of coefficients if the flag value is set.

19. The apparatus of claim 17, wherein the filter is an adaptive baseband equalization filter and the first logic checks whether a secondary coefficient corresponding to the adaptive baseband equalization filter is of a greater magnitude than a primary coefficient corresponding to the adaptive baseband equalization filter.

20. The apparatus of claim 19, wherein the second logic resets the plurality of coefficients if the secondary coefficient is of a greater magnitude than the primary coefficient.

21. The apparatus of claim 19, wherein the second logic resets the plurality of coefficients if the secondary coefficient is of a greater magnitude than a predetermined factor of the primary coefficient.

22. The apparatus of claim 17, wherein the filter is a lookup table filter and the first logic checks whether a coefficient of the plurality of coefficients corresponding to the data is greater than the first value.

23. The apparatus of claim 22, wherein the second logic resets the plurality of coefficients if the coefficient is greater than the first value.

24. The apparatus of claim 17, wherein the data is received during a vertical blanking interval.

25. An apparatus comprising:

means for monitoring a plurality of coefficients associated with a filter, the filter providing anti-ghosting to received data; and means for adjusting the plurality of coefficients if one or more of the plurality of coefficients exceed a first value.

26. The apparatus of claim 25, wherein the means for adjusting comprises:

means for setting a flag value, the flag value indicating whether the one or more of the plurality of coefficients exceeds the first value; and means for accessing the flag value at the end of a scan line of a vertical blanking interval and resetting the plurality of coefficients if the flag value is set.

27. The apparatus of claim 25, wherein the filter is an adaptive baseband equalization filter and the means for monitoring checks whether a secondary coefficient corresponding to the adaptive baseband equalization filter is of a greater magnitude than a primary coefficient corresponding to the adaptive baseband equalization filter.

28. The apparatus of claim 27, wherein the means for adjusting resets the plurality of coefficients if the secondary coefficient is of a greater magnitude than the primary coefficient.

29. The apparatus of claim 27, wherein the means for adjusting resets the plurality of coefficients if the secondary coefficient is of a greater magnitude than a predetermined factor of the primary coefficient.

30. The apparatus of claim 25, wherein the filter is a lookup table filter and the means for monitoring checks whether a coefficient of the plurality of coefficients corresponding to the data is greater than the first value.

31. The apparatus of claim 30, wherein the means for adjusting resets the plurality of coefficients if the coefficient is greater than the first value.

32. The apparatus of claim 25, wherein the data is received during a vertical blanking interval.

* * * * *